Jan. 23, 1934.  F. HENRARD  1,944,837
LUBRICATING DEVICE
Filed Oct. 4, 1929
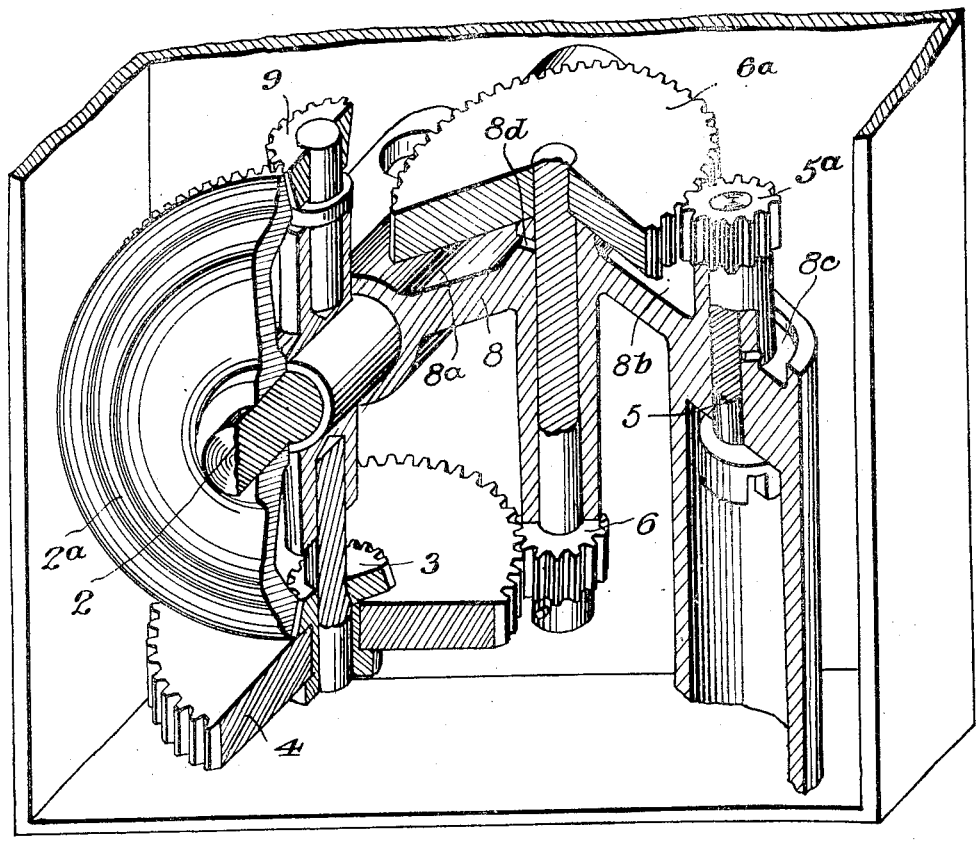
Inventor:
Fernand Henrard
By [signature]
Attorney Patented Jan. 23, 1934

1,944,837

UNITED STATES PATENT OFFICE 1,944,837

LUBRICATING DEVICE

Fernand Henrard, Brussels, Belgium, assignor to Ecremeuses Melotte, Societe Anonyme, Remicourt, Belgium Application October 4, 1929, Serial No. 397,283, and in Belgium April 11, 1929

1 Claim. (Cl. 184—11)

The present invention relates to a lubricating arrangement which is particularly suitable for use with separating machines for milk in which oil situated at a lower level is raised to a higher level to the parts to be lubricated.

For this purpose the invention provides for the oil to be taken at the lower level by a disc shaped member immersed in the oil at its lower part and upon which the oil adheres, this oil being subsequently taken from the upper part of the disc by a rotating member situated in contact with or very close to the disc, the speed of rotation and the dimensions of the latter member being such that it projects the oil by centrifugal force or collects it in order to allow it to flow on to the parts to be lubricated.

According to the invention the disc shaped member is made in the form of a bevel gear which engages with a bevel pinion gear forming the member adapted to collect and project the oil.

In the case when the parts to be lubricated are supported by a plate situated horizontally above the level of the liquid, the oil projected is collected in cavities formed in this plate and from here it flows towards the surfaces to be lubricated, for example through suitable ducts.

The invention also provides, in the case when the lubricating device according to the invention is applied to a speed multiplying or reducing system, for one of the gears of this system immersed in the oil to be employed for lubricating and the other part situated outside the oil to be lubricated in the manner above described.

The accompanying drawing illustrates by way of example and in a non-limiting manner one form of the invention. The latter extends to the various original features which the arrangement illustrated comprises.

The single figure in the drawing is a perspective view with parts in section of a speed multiplying device employing the lubricating process according to the invention and particularly suitable for use with a milk separating machine.

On the driving shaft 2 is keyed a bevel gear 2a immersed in oil at its lower part and imparting its movement of rotation to a pinion 3 keyed upon the same shaft as a toothed wheel 4. This movement of rotation is transmitted to the shaft 5 of a member to be driven which may be formed by the tubular member of a separating machine through the medium of toothed wheels 6 and 6a keyed upon the same shaft and of the pinion 5a keyed upon the shaft 5.

The wheels 6a and 5a, situated above the level of the oil, are carried by a plate 8 forming a bearing for the shaft of these wheels and formed in a single piece with the bearings of the gears 3 and 2a and of pinion gear 9.

As a result of the passage of the wheel 2a through the oil a part of this oil adheres and is taken up by the pinion gear 9.

As a result of the fact that the linear speed of the pinion gear 9 is equal to that of the wheel 2a but that the radius of the pinion gear is smaller than that of the other gear, the centrifugal force is greater upon the small pinion and the oil is projected laterally. In the case when the speed of this pinion gear is insufficient to project the oil by centrifugal force, the latter is nevertheless removed from gear 2a by the engagement of the gear 2a and the pinion gear 9 and flows to the parts to be lubricated. When thrown by centrifugal force, the oil bathes the upper faces of the gears 6a and 5a and their teeth, flows along these teeth and collects in cavities 8a, 8b, 8c of the plate 8. From there it flows towards the bearings of the shafts of the gears 6a and 5a either by a rise in the level in the said cavities or through suitable ducts such as 8d.

What I claim is:

A lubricating device suitable for cream separators, comprising a toothed wheel mounted on a horizontal crank-shaft of a cream separator and partially immersed in a body of lubricant, a vertical bowl-carrying shaft, a train of gears for transferring motion from said crank-shaft to said bowl-carrying shaft, certain of said gears being positioned above the level of said lubricant, a plate positioned above the level of the lubricant on which said gears are mounted, a conical pinion loosely mounted on a vertical axis above said plate and meshing with the aforementioned toothed wheel which is partially immersed in the lubricant, said conical pinion being adapted to remove the lubricant adhering to said toothed wheel during rotation and allow it to flow onto said plate and lubricate the gears mounted thereon.

FERNAND HENRARD.